US009891487B2

(12) United States Patent
Park et al.

(10) Patent No.: US 9,891,487 B2
(45) Date of Patent: Feb. 13, 2018

(54) ARRAY SUBSTRATE FOR DISPLAY DEVICE

(71) Applicant: Samsung Display Co. Ltd., Yongin-si (KR)

(72) Inventors: Dae Youn Park, Cheonan-si (KR); Sang Hun Lee, Suwon-si (KR); Min Jung Kang, Incheon (KR); Chang Hun Kwak, Suwon-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days.

(21) Appl. No.: 15/146,500

(22) Filed: May 4, 2016

(65) Prior Publication Data

US 2017/0010502 A1 Jan. 12, 2017

(30) Foreign Application Priority Data

Jul. 10, 2015 (KR) ........................ 10-2015-0098340

(51) Int. Cl.
  G02F 1/1335 (2006.01)
  G02F 1/1337 (2006.01)
  G02F 1/1339 (2006.01)
  G02F 1/1362 (2006.01)
  G02F 1/1333 (2006.01)
(52) U.S. Cl.
  CPC .... G02F 1/136209 (2013.01); *G02F 1/13394* (2013.01); *G02F 2001/133388* (2013.01)
(58) Field of Classification Search
  None
  See application file for complete search history.

(56) References Cited

U.S. PATENT DOCUMENTS

| 7,646,458 | B2 | 1/2010 | Onda | |
|---|---|---|---|---|
| 2005/0243235 | A1* | 11/2005 | Lee | G02F 1/13394 349/44 |
| 2006/0170854 | A1* | 8/2006 | Han | G02F 1/1339 349/153 |
| 2010/0014043 | A1* | 1/2010 | Ootaguro | G02F 1/1339 349/154 |
| 2015/0198842 | A1 | 7/2015 | Kwak et al. | |
| 2015/0234224 | A1 | 8/2015 | Jang et al. | |
| 2016/0026033 | A1 | 1/2016 | Kang et al. | |
| 2016/0062200 | A1* | 3/2016 | Jung | G02F 1/136286 349/43 |
| 2016/0187729 | A1* | 6/2016 | Teraoka | G02F 1/133711 349/123 |

FOREIGN PATENT DOCUMENTS

| JP | 11038424 | 2/1999 |
|---|---|---|
| KR | 101273890 | 6/2013 |
| KR | 10-2016-0013488 | 2/2016 |

* cited by examiner

*Primary Examiner* — Ashok Patel
(74) *Attorney, Agent, or Firm* — Cantor Colburn LLP

(57) ABSTRACT

An array substrate for a display device includes a first substrate which includes a display region and a non-display region enclosing a periphery of the display region, a second substrate facing the first substrate which includes the display region and the non-display region enclosing a periphery of the display region, a color filter disposed on the first substrate, a liquid crystal layer disposed on the color filter and a black matrix disposed on the first substrate in the non-display region and at least a part of the display region, where the black matrix has a thickness ranging from about 2.5 micrometers to about 6.0 micrometers.

20 Claims, 13 Drawing Sheets

ARRAY SUBSTRATE FOR DISPLAY DEVICE

This application claims priority to Korean Patent Application No. 10-2015-0098340 filed on Jul. 10, 2015, and all the benefits accruing therefrom under 35 U.S.C. § 119, the content of which in its entirety is herein incorporated by reference.

BACKGROUND

1. Field

Exemplary embodiment of the invention relates to an array substrate for a display device.

2. Description of the Related Art

With the development of multimedia, display devices have become increasingly important. Accordingly, various types of display devices such as a liquid crystal display ("LCD") and an organic electroluminescent display device are being used.

In general, an LCD is configured in that an electric field is applied to a liquid crystal material having dielectric anisotropy interposed between two substrates, and the intensity of the electric field is adjusted to control the quantity of light transmitted to the substrates from an external light source, thereby obtaining desired image signals.

The liquid crystal material in a liquid state interposed between the two substrates is deposited on a display substrate. Uniformity in dispersion and dispersion speed of liquid crystals play a significant role in causing defects on display quality, and thus a study for the improvement in the dispersion of liquid crystals has been conducted. Furthermore, a study for improving light leakage in a non-display region also has been processed with the demand for smaller and thinner LCDs.

SUMMARY

An exemplary embodiment of the invention provides an array substrate for a display device, in which liquid crystals are uniformly dispersed to prevent defects on display quality.

Another exemplary embodiment of the invention provides an array substrate for a display device, in which light leakage caused by liquid crystal decomposition in a non-display region can be prevented.

Yet another exemplary embodiment of the invention provides an array substrate for a display device, in which light leakage in a non-display region can be effectively improved even in a thin device.

However, embodiments of the invention are not restricted to those set forth herein. The other embodiments of the invention which are not mentioned herein will become more apparent to a person skilled in the art to which the invention pertains by referencing the detailed description of the invention given below.

An array substrate for a display device according to an exemplary embodiment includes a first substrate which includes a display region and a non-display region enclosing a periphery of the display region, a second substrate facing the first substrate which includes the display region and the non-display region enclosing a periphery of the display region, a color filter disposed on the first substrate, a liquid crystal layer disposed on the color filter; and a black matrix disposed on the first substrate in the non-display region and at least a part of the display region, where the black matrix has a thickness ranging from about 2.5 micrometers ($\mu m$) to about 6.0 $\mu m$.

In an exemplary embodiment, the thickness of the black matrix may range from about 2.8 $\mu m$ to about 3.2 $\mu m$.

In an exemplary embodiment, the array substrate for a display device may further include a sealing material provided along peripheries of the first substrate and the second substrate in the non-display region so as to bond and seal the first substrate and the second substrate, a dummy region may be disposed between the sealing material and the display region, and the black matrix may include at least one convex portion convex toward the second substrate in the dummy region.

In an exemplary embodiment, the convex portion may have a horizontal cross sectional surface shaped as a circle or a polygon.

In an exemplary embodiment, the black matrix may include at least two convex portions, and the convex portions may be spaced apart from each other.

In an exemplary embodiment, the black matrix may have a flat portion between the convex portions.

In an exemplary embodiment, the array substrate for a display device may further include a color filter dam disposed between the black matrix and the first substrate in the dummy region and extended in a first direction, the black matrix may include a dam portion disposed on the color filter dam, the dam portion may be farther from the first substrate when compared with other portions of the black matrix.

In an exemplary embodiment, the sealing material and the dam portion of the black matrix may be spaced apart by a predetermined gap.

In an exemplary embodiment, the convex portion may be disposed between the dam portion and the display region.

In an exemplary embodiment, the convex portion may extend in parallel with the first direction of the dam portion.

In an exemplary embodiment, the color filter dam may include components same as components of the color filter.

In an exemplary embodiment, the array substrate for a display device may further include an orientation layer disposed on the black matrix, the orientation layer may be disposed all over the display region and disposed between the dam portion and the display region.

An array substrate for a display device according to another exemplary embodiment includes a first substrate which includes a display region and a non-display region enclosing a periphery of the display region, a second substrate facing the first substrate which includes the display region and the non-display region enclosing a periphery of the display region, a color filter disposed on the first substrate, a liquid crystal layer disposed on the color filter and a black matrix provided in the non-display region and at least a part of the display region and disposed on the first substrate, the color filter is not disposed between the black matrix and the first substrate in at least a part of the non-display region.

In an exemplary embodiment, the black matrix may have a thickness ranging from about 2.5 $\mu m$ to about 6.0 $\mu m$ in the non-display region.

In an exemplary embodiment, the black matrix may have a thickness ranging from about 2.8 $\mu m$ to about 3.2 $\mu m$ in the dummy region.

In an exemplary embodiment, the array substrate for a display device may further include a sealing material provided along peripheries of the first substrate and the second substrate in the non-display region so as to bond and seal the first substrate and the second substrate, a dummy region may be disposed between the sealing material and the display region, and the black matrix may include at least one convex portion convex toward the second substrate in the dummy region.

In an exemplary embodiment, the array substrate for a display device may further include a color filter dam disposed between the black matrix and the first substrate in a part of the dummy region, and including components same as components of the color filter, the black matrix may includes a dam portion disposed on the color filter dam, and the dam portion may be farther from the first substrate when compared with other portions of the black matrix.

In an exemplary embodiment, the convex portion may be disposed between the dam portion and the display region.

In an exemplary embodiment, the convex portion may have a horizontal cross sectional surface shaped as a circle or a polygon.

In an exemplary embodiment, the black matrix may include at least two convex portions, and the convex portions spaced apart from each other.

In an exemplary embodiment, the array substrate for a display device may prevent defects on display quality since liquid crystals are uniformly coated.

In an exemplary embodiment, the array substrate for a display device may prevent light leakage caused by liquid crystal decomposition in a non-display region.

In an exemplary embodiment, the array substrate for a display device may effectively improve light leakage in a non-display region in a thin device.

BRIEF DESCRIPTION OF THE DRAWINGS

The accompanying drawings, which are included to provide a further understanding of the invention and are incorporated in and constitute a part of this specification, illustrate exemplary embodiments of the invention, and, together with the description, serve to explain the principles of the invention.

DETAILED DESCRIPTION

Figure 1:
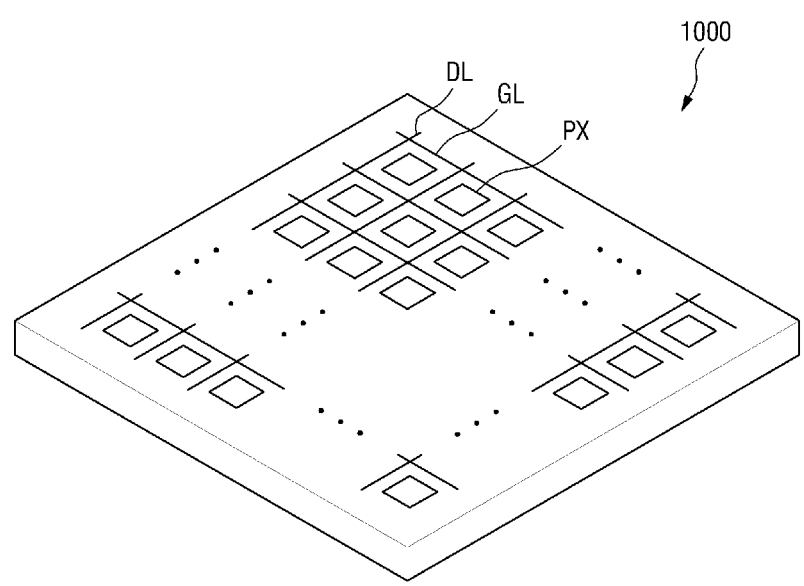
FIG. 1 is a perspective view of an array substrate for a display device according to an exemplary embodiment of the invention.

The invention is described more fully hereinafter with reference to the accompanying drawings, in which embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region provided by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be described in detail with reference to the accompanying drawings.

FIG. 1 is a schematic perspective view of an array substrate for a display device according to an exemplary embodiment of the invention.

Referring to FIG. 1, an array substrate 1000 for a display device according to an exemplary embodiment of the invention may include a plurality of data lines DL, a plurality of gate lines GL and a plurality of pixels PX.

The plurality of gate lines GL may be arranged into space apart columns separated by a predetermined spacing, and may receive respective gate signals transferred thereto, and the plurality of data lines DL may be arranged into space apart rows separated by a predetermined spacing, and may receive respective data signals transferred thereto. The plurality of gate lines GL and the plurality of data lines DL may be arranged in a matrix, and pixels PX may be arranged in the respective intersecting portions therebetween. The gate signals and the data signals may be generated and provided from an external source, and may have voltage values of various levels.

To realize colors on displays, each pixel PX may uniquely display one color among the primary colors including, for example, red, green and blue colors. In this case, the pixel PX that displays a red color may be referred to as a red pixel, the pixel PX that displays a green color may be referred to as a green pixel, and the pixel PX that displays a blue color may be referred to as a blue pixel, and three pixels PXs having the respective colors may be referred to as one upper pixel (not shown). In an exemplary embodiment, the red pixels, the green pixels and the blue pixels may be alternately arranged in a column direction or a row direction, or the three pixels may be arranged at the respective vertices of a triangle, for example. The pixels may be arranged in various other ways, and the invention is not limited to the pixel arrangement described above.

Figure 2:
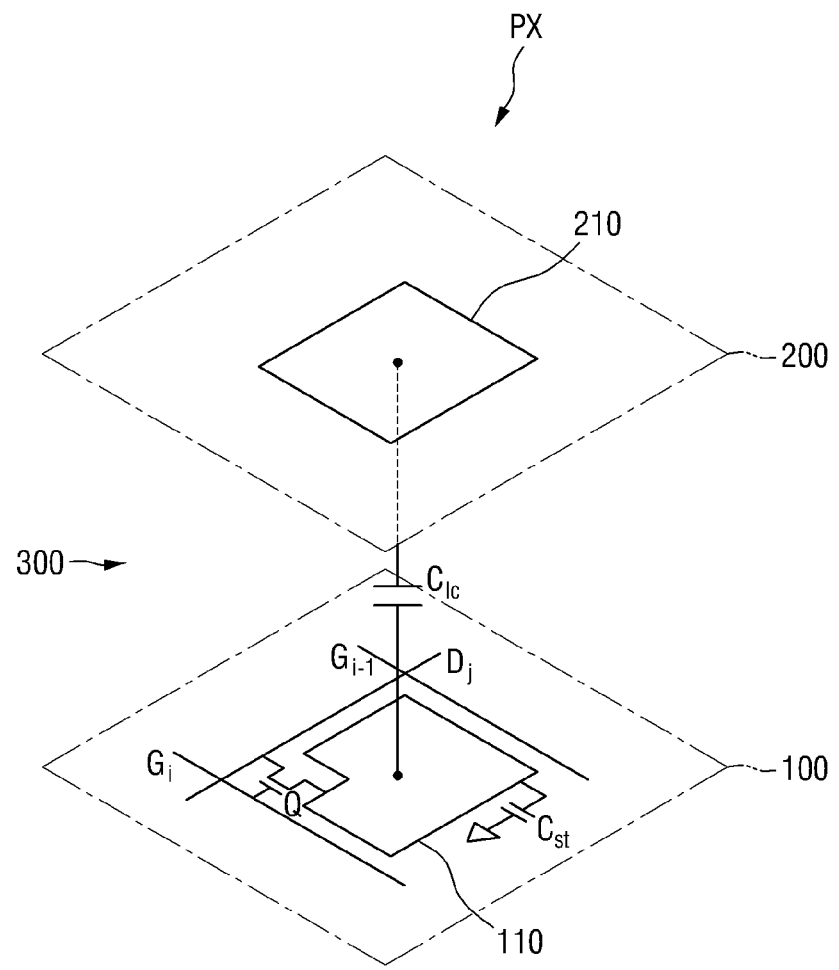
FIG. 2 is a schematic view illustrating a structure of one pixel according to an exemplary embodiment of the invention.

FIG. 2 is a schematic view illustrating a structure of one pixel according to an exemplary embodiment of the invention.

Referring to FIG. 2, the pixel PX may include a first substrate 100, a second substrate 200 and a liquid crystal layer 300 interposed between the two substrates. The pixel PX may further include a switching element Q connected to the gate lines GL and the data lines DL, and the switching element Q may be connected to a pixel electrode 110 (refer to FIG. 4).

The pixel electrode 110 may cooperate with a common electrode 210 disposed on the second substrate 200 so as to form a liquid crystal capacitor Clc, and the pixel electrode 110 may include a storage capacitor Cst. However, the invention is not limited thereto, and the storage capacitor Cst may be omitted as needed.

In an exemplary embodiment, the switching element Q may be a tri-terminal element including a thin film transistor ("TFT") and the like, for example, provided on the first substrate 100, and a control terminal thereof may be connected to a gate line Gi, an input terminal thereof may be connected to a data line Dj, and an output terminal thereof may be connected to the liquid crystal capacitor Clc and the storage capacitor Cst.

The liquid crystal capacitor Clc may include two terminals respectively connected to the pixel electrode 110 of the first substrate 100 and the common electrode 210 of the second substrate 200, and the liquid crystal layer 300 between the pixel electrode 110 and the common electrode 210 may serve as dielectrics. The pixel electrode 110 may be connected to the switching element Q, and the common electrode 210 may be disposed on the whole surface of the second substrate 200 so as to receive a common voltage provided thereto.

The storage capacitor Cst which serves to assist the liquid crystal capacitor Clc may be provided by overlapping a separate signal line (not shown) and the pixel electrode 110 provided on the first substrate 100 with an insulator therebetween, and a predetermined voltage such as the common voltage may be provided to this separate signal line (not shown). However, the storage capacitor Cst may be provided by overlapping the pixel electrode 110 and a front end gate line Gi-1 right above the pixel electrode 110 with an insulator therebetween.

To display colors as described above with reference to FIG. 1, each pixel PX may uniquely display one of primary colors, but a color filter (not shown) may be provided on the first substrate 100 so as to display colors. This will be described in detail with reference to FIG. 3.

Figure 3:
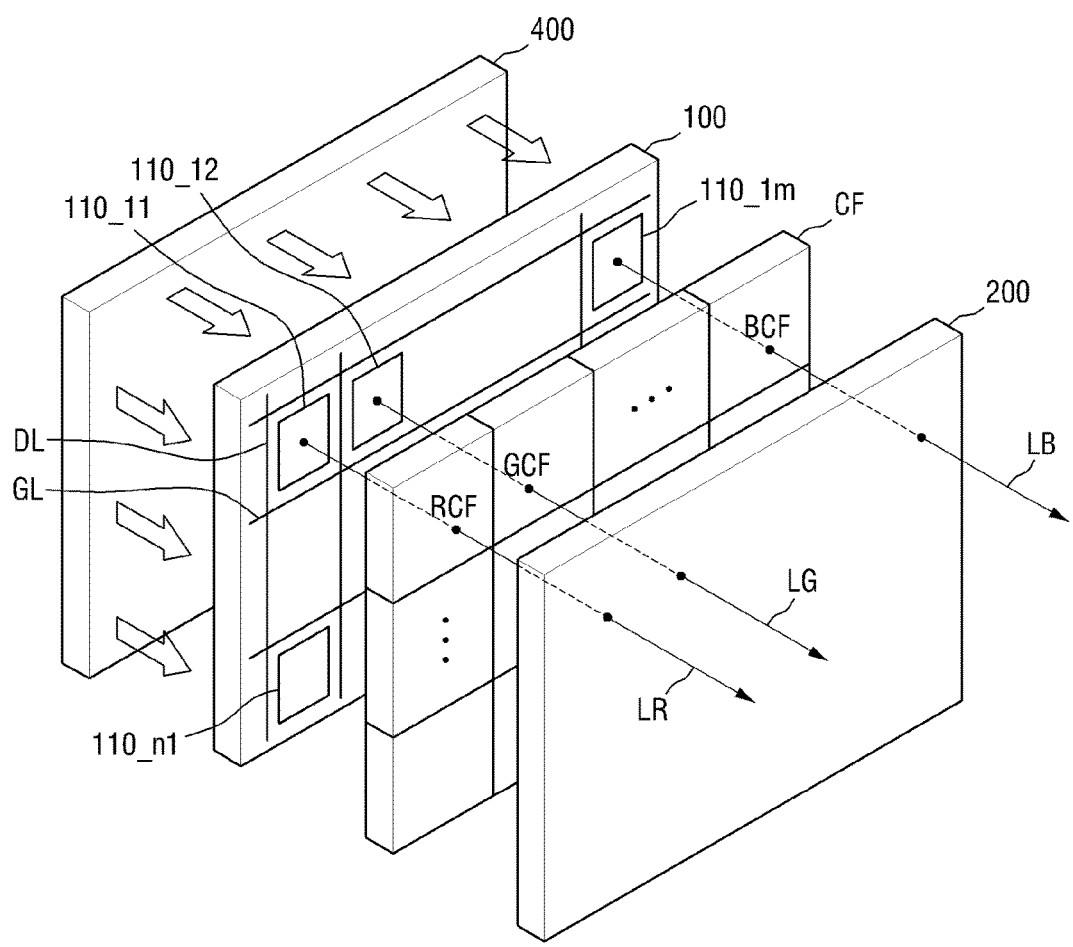
FIG. 3 is an exploded perspective view of an array substrate and a backlight unit of a display device according to an exemplary embodiment of the invention.

FIG. 3 is an exploded perspective view of an array substrate and a backlight unit of a display device according to an exemplary embodiment of the invention.

Referring to FIG. 3, the array substrate 1000 for a display device may include a color filter CF interposed between the second substrate 200 and the first substrate 100. The display device including the array substrate 1000 for a display device may include a backlight unit 400 arranged at the back surface of the array substrate 1000 for a display device.

The backlight unit 400 may emit white light having various wavelength components. The structure and shape of the backlight unit 400 are not limited to those shown in FIG. 3, and the backlight unit 400 may include a light source including a cold cathode fluorescent lamp, a light emitting diode and the like, and other types of light sources and structures of backlight units are widely known in the art, and thus detailed description thereof will be omitted.

The color filter CF may include a plurality of color filters RCF, GCF and BCF, and may pass the light having a specific wavelength range among the light emitted from the backlight unit 400 having various wavelength components so as to enable each pixel PX to display a specific color.

The plurality of neighboring color filters RCF, GCF and BCF constituting the color filter CF may correspond to the respective different colors, and the arrangement and shape of the color filters are not limited to a matrix shown in FIG. 3, and may have various other arrangements and shapes.

The color filters RCF, GCF and BCF constituting the color filter CF may be arranged to correspond to the direction in which the light emitted from the backlight unit 400 passes through the pixel electrode 110 and advances, such that the color filters RCF, GCF and BCF may display different colors for the respective corresponding regions of the pixel electrode 110. However, the invention is not limited thereto, and one color filter may be arranged to correspond to a plurality of pixels PX, or a plurality of color filters may be arranged to correspond to one pixel PX.

Specifically, first light LR incident from the backlight unit 400 to a pixel electrode 110_11 in a first column first row may pass through the red color filter RCF corresponding to the pixel electrode 110_11 in the first column first row and may then be changed to light that mostly includes a wavelength component corresponding to a red color, and the changed light may pass through the second substrate 200 and advance so as to be viewed as a red color to a user using a completed display device.

Second light LG incident from the backlight unit 400 to a pixel electrode 110_12 in a first column second row may pass through the green color filter GCF corresponding to the pixel electrode 110_12 in the first column second row and may then be changed to light that mostly includes a wavelength component corresponding to a green color, and the changed light may pass through the second substrate 200 and advance so as to be viewed as a green color to a user using a completed display device.

Third light LB incident from the backlight unit 400 to a pixel electrode 110_1m in a first column mth row may pass through the blue color filter BCF corresponding to the pixel electrode 110_1m in the first column mth row and may then be changed to light that mostly includes a wavelength component corresponding to a blue color, and the changed light may pass through the second substrate 200 and advance so as to be viewed as a blue color to a user using a completed display device.

The shape of each of the color filters RCF, GCF and BCF is not limited to the rectangular shape shown in FIG. 3, and may be varied. Furthermore, the color filters RCF, GCF and BCF may not be divided by a straight line but may be divided by a curved line, and parts of the color filters may be overlapped with each other.

Figure 4:
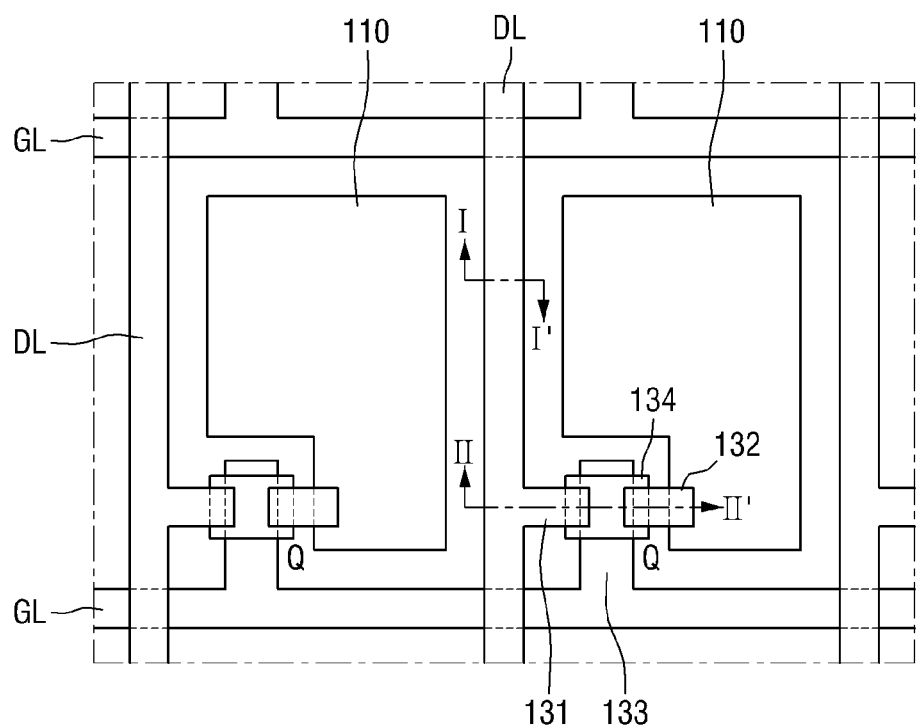
FIG. 4 is a plan view of an array substrate for a display device according to an exemplary embodiment of the invention.

FIG. 4 is a plan view of a part of a display region in an array substrate for a display device according to an exemplary embodiment of the invention.

Referring to FIG. 4, the array substrate 1000 for a display device may include the plurality of data lines DL extending in a first direction on the first substrate 100, the plurality of gate lines GL extending in a second direction on the first substrate 100, the switching element Q electrically connected to the data lines DL and the gate lines GL, and the pixel electrode 110 connected to the switching element Q.

The first substrate may include a transparent insulating material, the data lines DL may include a plurality of data electrodes 131, and the gate lines GL may include a plurality of gate electrodes 133. The switching element Q may include a TFT, and specifically, may have a source terminal to which the data electrode 131 corresponds, a control terminal to which the gate electrode 133 corresponds and a drain terminal to which a drain electrode 132 connected to the pixel electrode 110 corresponds. The switching element Q may include a semiconductor layer 134 capable of electrically connecting the data electrode 131 and the drain electrode 132 by the voltage provided to the gate electrode 133.

Furthermore, the color filter CF (refer to FIG. 5), the common electrode 210 (refer to FIG. 5) and the second substrate 200 (refer to FIG. 5) may be disposed on the data lines DL, the gate lines GL, the switching element Q and the pixel electrode 110. The detailed description thereof will be made with reference to FIG. 5.

Figure 5:
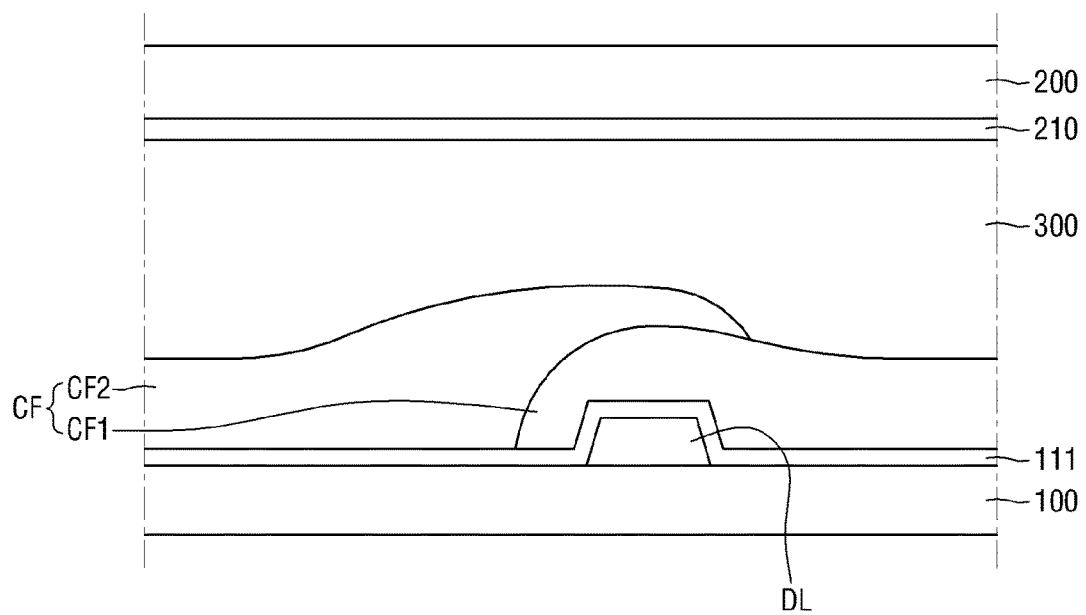
FIG. 5 is a cross-sectional view of an array substrate for a display device taken along line I-I' of FIG. 4.

FIG. 5 is a cross-sectional view of an array substrate for a display device taken along line I-I' of FIG. 4.

Referring to FIG. 5, the data line DL may be disposed on the first substrate 100. An insulation layer 111 may be disposed on the data line DL and the first substrate 100 on which the data line DL is not provided. In an exemplary embodiment, the insulation layer 111 may include a silicon oxide layer, a silicon nitride layer or a double layer thereof, but the invention is not limited thereto and the insulation layer 111 may include other materials.

The color filter CF including a plurality of color filters CF1 and CF2 may be disposed on the insulation layer 111, and each of the color filters CF1 and CF2 may pass light having different wavelength ranges and enable light passing through each color filter to have a specific color as described above.

The liquid crystal layer 300 may be disposed on the color filter CF. The liquid crystal layer 300 may include a large number of liquid crystal molecules, and an alignment of the liquid crystal molecules may be controlled by the electric field provided through the liquid crystal layer 300. Furthermore, the quantity of light passing through the liquid crystal layer 300 may be controlled by the alignment of the liquid crystal molecules, and the color filter CF and the liquid crystal layer 300 may cooperate with each other so as to display a desired color.

A common electrode 210 may be disposed on the liquid crystal layer 300. As described above, the common electrode 210 may cooperate with the pixel electrode 110 so as to form the liquid crystal capacitor Clc (refer to FIG. 2) to control the liquid crystal molecules.

In an exemplary embodiment, the second substrate 200 may be disposed on the common electrode 210, and may include a transparent material for transmission of light.

The color filter CF may include the first color filter CF1 and the second color filter CF2, where the first color filter CF1 may be disposed at one side of the data line DL and the second color filter CF2 may be disposed at the other side of the data line DL. Specifically, as shown in FIG. 5, the first color filter CF1 may be disposed at the right side of the data line DL and the second color filter CF2 may be disposed at the left side of the data line DL. Furthermore, the first color filter CF1 may extend from one side toward the other side of the data line DL so as to overlap the data line DL.

The first color filter CF1 and the second color filter CF2 may overlap each other on the data line DL. Since the first color filter CF1 and the second color filter CF2 may overlap each other, the height of the color filter on the data line DL may be higher than the height thereof in the other region of the color filter.

Figure 6:
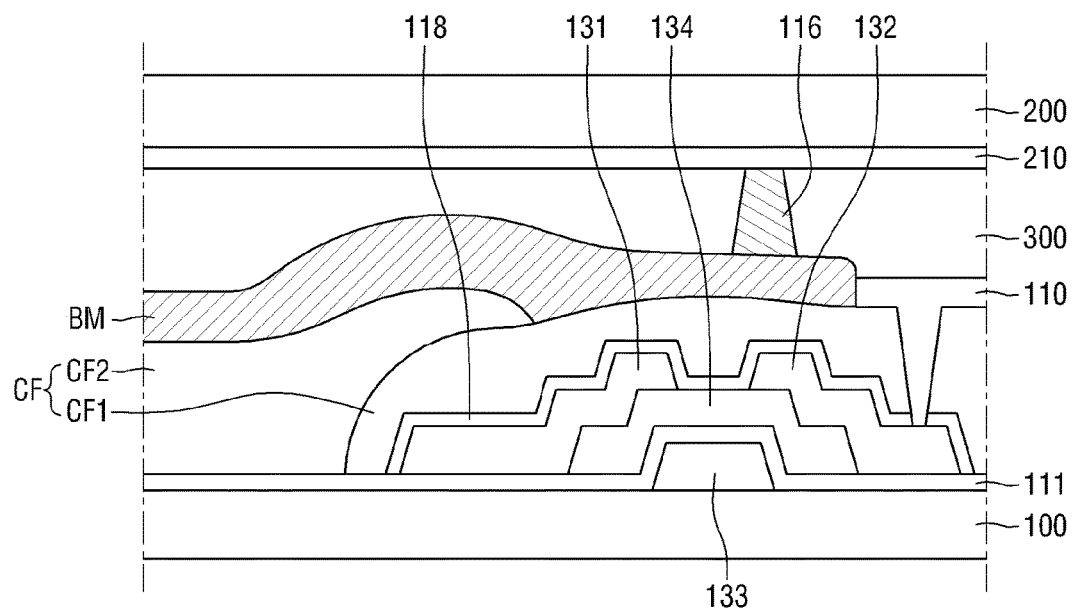
FIG. 6 is a cross-sectional view of an array substrate for a display device taken along line II-II' of FIG. 4.

FIG. 6 is a cross-sectional view of an array substrate for a display device taken along line II-II' of FIG. 4.

Referring to FIG. 6, the switching element Q (refer to FIG. 4) may be disposed on the first substrate 100. FIG. 6 illustrates an example in which the switching element Q includes a TFT.

Specifically, the gate line GL (refer to FIG. 4) including the gate electrode 133 may be disposed on the first substrate 100. The insulation layer 111 may be disposed on the gate line GL. As described above, the insulation layer 111 may include a silicon oxide layer, a silicon nitride layer or a double layer thereof, but the invention is not limited thereto and the insulation layer 111 may include other materials.

The semiconductor layer 134 may be disposed on the insulation layer 111 so as to pass flowing current or block the current depending on the voltage provided to the gate line GL.

The data electrode 131 and the drain electrode 132 may be disposed on the semiconductor layer 134. The data electrode 131 may extend from the data line DL, and the data signal provided to the data line DL may be transferred to the semiconductor layer 134. An ohmic contact layer (not shown) may be provided between the data electrode 131 and the semiconductor layer 134 so as to smoothly transfer the data signal. The drain electrode 132 may have one side connected to the semiconductor layer 134 and the other side connected to the pixel electrode 110 so as to provide the data signal passed through the semiconductor layer 134 to the pixel electrode 110. Similarly to those between the data electrode 131 and the semiconductor layer 134, an ohmic contact layer (not shown) may be provided between the drain electrode 132 and the semiconductor layer 134 so as to smoothly transfer the data signal.

Furthermore, a second insulation layer 118 may be disposed on the data line DL, the data electrode 131, the semiconductor layer 134 and the drain electrode 132. In an exemplary embodiment, the second insulation layer 118 may include a silicon oxide layer, a silicon nitride layer or a double layer thereof, but the invention is not limited thereto and the second insulation layer 118 may include other materials. The second insulation layer 118 may be omitted as needed.

The color filter CF including the plurality of color filter CF1 and CF2 may be disposed on the switching element Q, and the first color filter CF1 and the second color filter CF2 may pass light having different wavelength ranges and enable light passing through each color filter CF1 and CF2 to have a specific color as described above.

A black matrix BM may be disposed on the color filter CF. The block matrix BM may block light. The black matrix M may prevent a reflection of light caused by various lines on the array substrate 1000 for a display device and prevent the lines from being seen when a user looks down the array substrate 1000 for a display device. The black matrix BM may be overlapped with various line on the array substrate 1000 for a display device so as to prevent undesired color mixing and to block light.

A column spacer 116 may be disposed on the black matrix BM. The column spacer 116 may support the second substrate 200. The column spacer 116 may include a material same as that of the black matrix BM. That is, the column spacer 116 and the black matrix BM may include the same material and provided simultaneously by using a two tone mask. In this case, the column spacer 116 may be provided into a shape including a protrusion provided by protruding a part of the black matrix BM. However, the invention is not limited thereto, and the black matrix BM and the column spacer 116 may be provided through other methods.

The liquid crystal layer 300 may be disposed on the black matrix BM. As described above, the liquid crystal layer 300 may include a large number of liquid crystal molecules the alignment of which may be controlled by the electric field provided through the liquid crystal layer 300. Furthermore, the quantity of light passing through the liquid crystal layer 300 may be controlled by the alignment of the liquid crystal molecules, and the color filter CF and the liquid crystal layer 300 may cooperate with each other so as to display a desired color.

The common electrode 210 may be disposed on the liquid crystal layer 300. As mentioned above, the common electrode 210 may cooperate with the pixel electrode 110 so as to form the liquid crystal capacitor Clc to control the liquid crystal molecules.

The second substrate 200 may be disposed on the common electrode 210, and including a transparent material capable of transmitting light.

Figure 7:
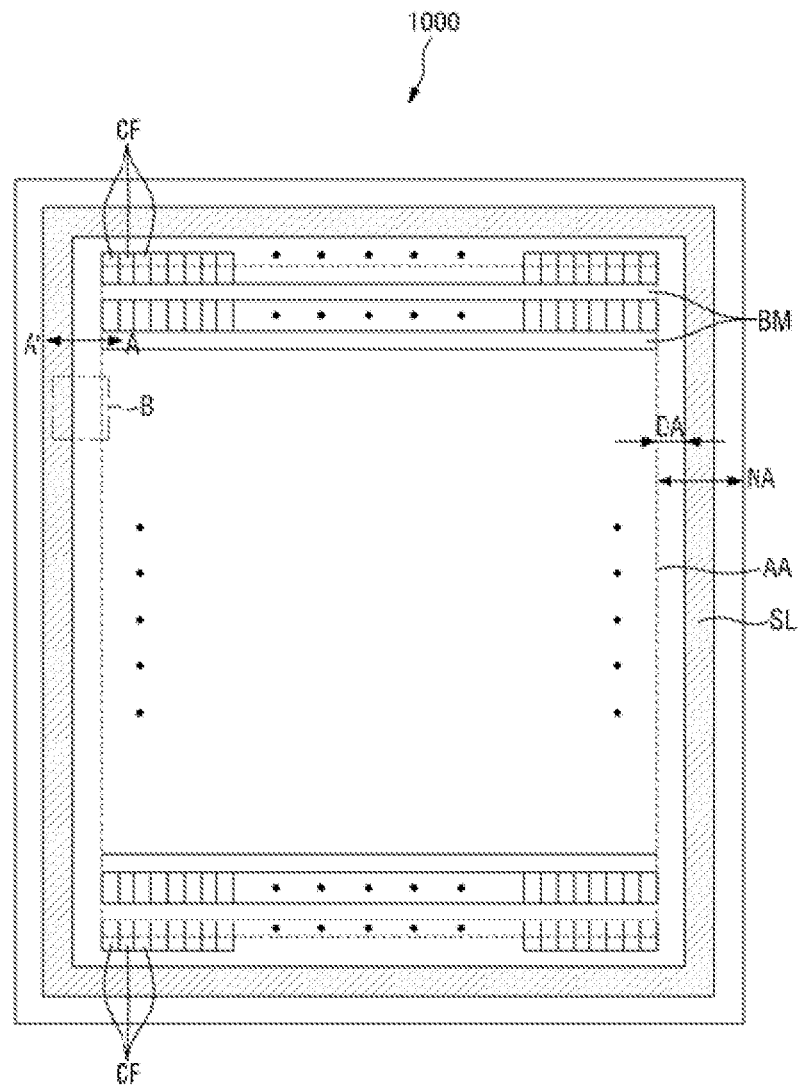
FIG. 7 is an overall plan view of an array substrate for a display device according to an exemplary embodiment of the invention.
Figure 8:
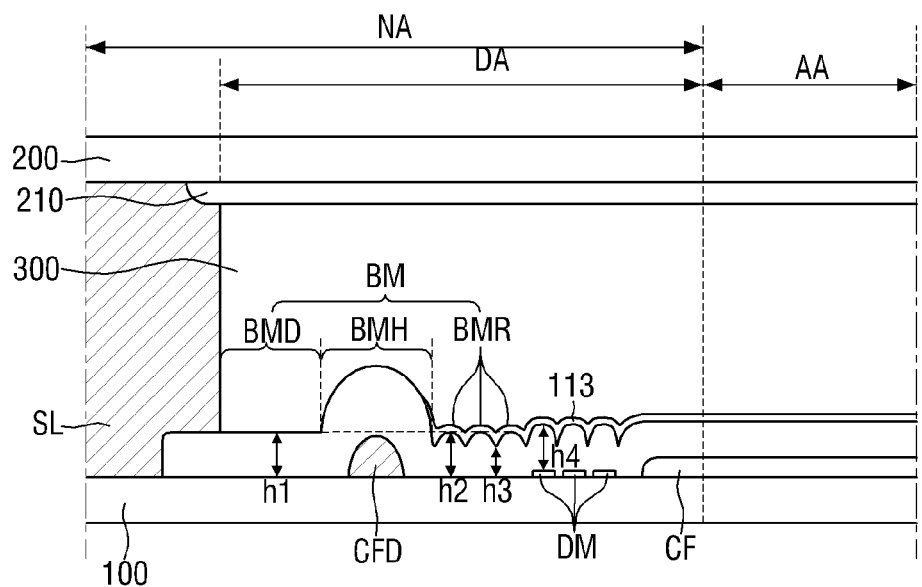
FIG. 8 is a cross-sectional view of an array substrate for a display device taken along line A-A' of FIG. 7.

FIG. 7 is an overall plan view of an array substrate for a display device according to an exemplary embodiment of the invention. FIG. 8 is a cross-sectional view taken along line A-A' of FIG. 7.

Referring to FIGS. 7 and 8, the array substrate for a display device may include a display region AA and a non-display region NA enclosing the periphery of the display region AA. The non-display region NA may include a dummy region DA enclosing the display region AA.

A sealing material SL for bonding and sealing the first substrate 100 and the second substrate 200 may be provided in the non-display region NA, and the sealing material SL may be provided along peripheries of the first substrate and the second substrate so as to seal internal elements constituting the array substrate for a display device. The non-display region NA may include therein the dummy region DA, where the dummy region DA may be defined as an inside from the sealing material SL on the non-display region NA, that is, a region between the sealing material SL and the display region AA.

The array substrate for a display device may include the first substrate 100 and the second substrate 200 facing each other with the display region AA and the non-display region NA therebetween, the color filter CF disposed on the first substrate 100, the liquid crystal layer 300 disposed on the color filter CF, and the black matrix BM provided in the non-display region NA and at least a part of the display region AA on the first substrate 100.

In an exemplary embodiment, the black matrix BM may have a thickness ranging from about 2.5 μm to about 6.0 μm, and for example, ranging from about 2.5 μm to about 4.0 μm, or about 2.8 μm to about 3.2 μm. These ranges may further effectively prevent light leakage in the non-display region.

More specifically, the color filter CF may not be disposed between the black matrix BM and the first substrate 100 in at least a part of the non-display region NA. The color filter CF may be disposed only beneath the black matrix BM in an area extending from the display region AA to the dummy region DA, and only the black matrix BM may be provided in the other area excluding a color filter dam CFD for preventing the movement of an orientation layer 113 provided as needed, which will be described later, thereby effectively improving light leakage in the non-display region.

On the dummy region DA, the area in which only the black matrix BM is provided may be wider than the area in which both the color filter CF and the black matrix BM are provided. That is, the area in which both the color filter CF and the black matrix BM are provided may be a very local region, and only the back matrix BM may be provided in the greater part of the region, thereby effectively blocking light transmitted through the non-display region.

The black matrix BM may include at least one convex portion BMR convex toward the second substrate 200 on the dummy region DA. When two or more convex portions BMR are provided, the convex portions BMR may be adjacent each other. A valley may be provided between the convex portions BMR, and the convex portions BMR provided at both sides of the valley may be interconnected. The black matrix BM including the convex portions BMR may satisfy the aforementioned thickness ranges. That is, a height h2 of a top and a height h3 of the valley of the convex portion BMR may satisfy the aforementioned thickness ranges of the black matrix BM, and the aforementioned thickness ranges effectively prevent light leakage in the non-display region. Thus-satisfied ranges may enable uniform liquid crystal dispersion in the display region.

The color filter dam CFD may be interposed between the black matrix BM and the first substrate 100 and extend in one direction on the dummy region DA. Furthermore, the black matrix BM may include a dam portion BMH on the color filter dam CFD.

The black matrix BM may include a flat portion BMD between the dam portion BMH and the sealing material SL. That is, the flat portion BMD may be spaced apart from the sealing material SL so as to secure a predetermined margin.

The color filter dam CFD may be provided into the shape of an island in a vertical cross sectional direction, and including components same as those of the color filter CF. That is, the color filter dam CFD may be spaced apart from the color filter CF disposed on the display region AA and disposed in a part of the dummy region DA in the process of forming the color filter CF on the display region AA on the first substrate 100 and extending a part of the color filter so that the extended part can be disposed in a part of the dummy region DA adjacent to the display region AA. Thus, the black matrix BMH disposed on the color filter dam CFD, that is the dam portion BMH, may be farthest from the first substrate 100 when compared with other black matrix portions on the dummy region DA.

In other words, when the thickness of the black matrix BM provided in the area excluding the dam portion BMH and the thickness of the black matrix BM provided in the dam portion BMH are the same, the dam portion BMH may get farther from the first substrate 100 due to the color filter dam CFD, and thus, the dam portion BMH may serve as a dam for preventing the orientation layer 113 which will be discussed later from permeating into the sealing material SL. Specifically, when a thickness h1 of the flat portion BMD between the dam portion BMH and the sealing material SL and the thickness h2 of the top of the convex portion BMR are the same, the height of the dam portion BMH may be the same as those, however, the dam portion BMH may get relatively farther from the first substrate 100 due to the color filter dam CFD, thereby maintaining the orientation layer 113 only inside the dam portion BMH. However, the invention is not limited thereto, and the orientation layer 113 may be provided along a part of a sidewall of the dam portion BMH in a process.

Figure 9:
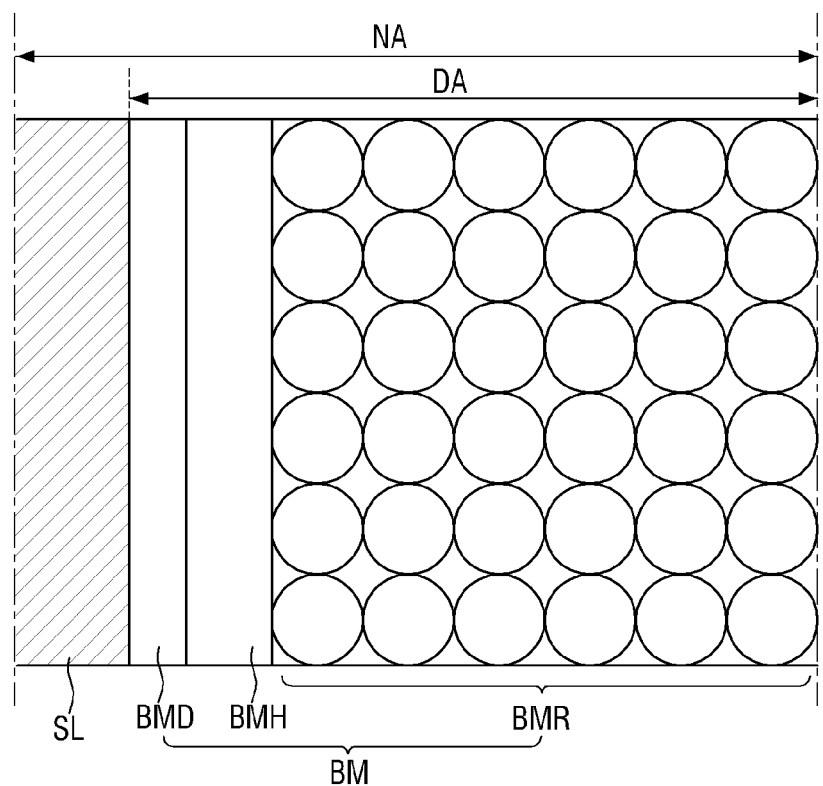
FIG. 9 is a plan view of part B of an array substrate for a display device of FIG. 7.

As shown in FIGS. 8 and 9, the convex portion BMR may be provided between the dam portion BMH on the dummy region DA and the display region AA (refer to FIG. 7). The convex portion BMR may serve to widen the surface area of the black matrix BM, delay the flow of the liquid crystals from the display region AA, and prevent the liquid crystals from quickly flowing into the sealing material SL.

In an exemplary embodiment, the sealing material SL may include an ultraviolet curing material, and hardened by irradiating ultraviolet rays thereto. When a liquid crystal composition permeates into the sealing material during the process of irradiating ultraviolet rays, light leakage may occur in the non-display region due to a decomposition of the liquid crystal composition. In the array substrate for a display device according to the invention, the convex portions BMR of the black matrix BM may delay flow of the liquid crystals, thereby preventing the liquid crystals from permeating into the sealing material SL during ultraviolet hardening of the sealing material SL, leading to prevention against light leakage. Furthermore, the aforementioned thickness ranges in the dummy region DA may be satisfied while forming the convex portions BMR in the black matrix BM, thereby further effectively preventing light leakage in the dummy region DA.

The convex portions BMR of the black matrix BM may be provided adjacent to the dam portion BMH, and may have a circular cross sectional shape, but the invention is not limited thereto, and the convex portions BMR may have a polygonal cross sectional shape including a tetragonal shape, a pentagonal shape and the like, or a mixed shape thereof.

The black matrix BM may include at least two convex portions BMR, and the convex portions BMR having the same horizontal cross sectional surface may be consecutively arranged as shown in FIG. 9, but the invention is not limited thereto.

The orientation layer 113 may be disposed on the black matrix BM, and a part of the orientation layer 113 may be disposed on the color filter CF in the display region AA. The orientation layer 113 may be disposed on the whole upper surface of the color filter CF on the display region AA so as to determine the orientation of the liquid crystal layer 300 disposed on the orientation layer 113. The orientation layer 113 may also be provided in the dummy region DA of the non-display region NA, and may be blocked by the dam portion BMH so as not to be in contact with the sealing material SL. Since the orientation layer 113 is widely known in the art, a detailed description thereof will be omitted.

A dummy electrode DM may be interposed between the black matrix BM and the first substrate 100 so as to improve adhesion between the first substrate 100 and the black matrix BM. Although not shown in the drawing, the dummy electrode DM may be disposed beneath the color filter CF which extends from the display region AA to a part of the dummy region DA. Since the dummy electrode DM is widely known in the art, a detailed description thereof will be omitted.

Figure 10:
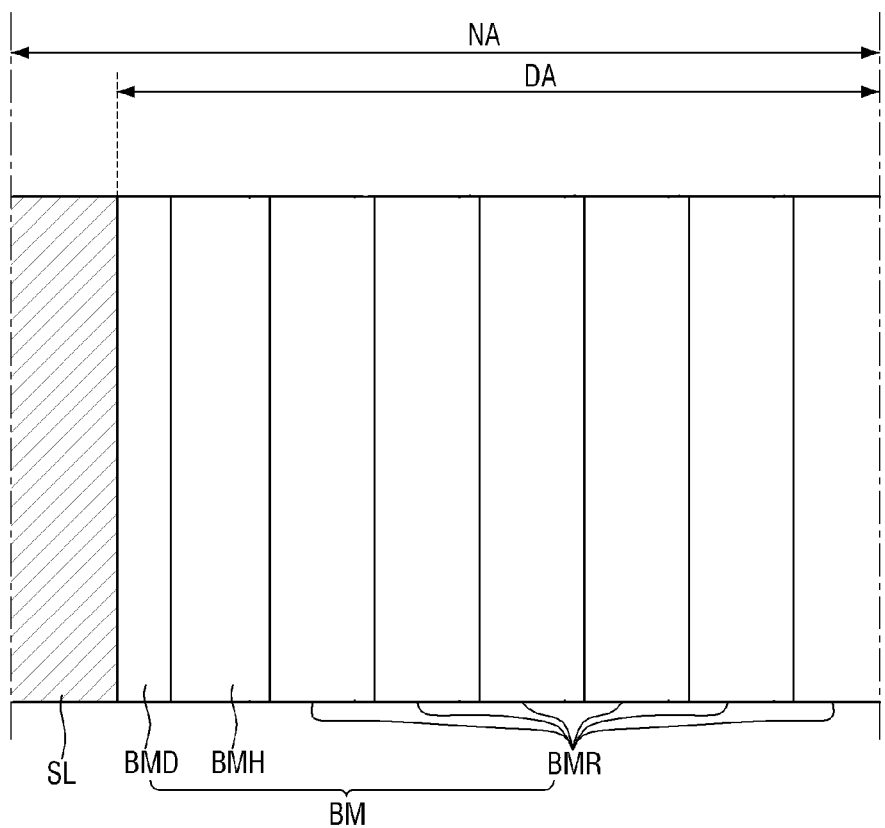
FIG. 10 is a plan view of part B of the array substrate for a display device of FIG. 7 according to another exemplary embodiment of the invention.

FIG. 10 is a plan view of part B of then array substrate for a display device of FIG. 7 according to another exemplary embodiment of the invention.

Referring to FIG. 10, the convex portions BMR of the black matrix BM may extend in parallel with one direction of the dam portion BMH. That is, the convex portions BMR may extend in one direction on the substrate 100 on a horizontal cross sectional surface. Although not shown in the drawing, the dam portion BMH of the black matrix BM may extend in one direction in the dummy region DA and enclose the periphery of the display region AA, and the convex portions BMR may also extend in one direction in the dummy region DA and enclose the periphery of the display region AA. Since other components have already been described above, a duplicated description thereof will be omitted.

Figure 11:
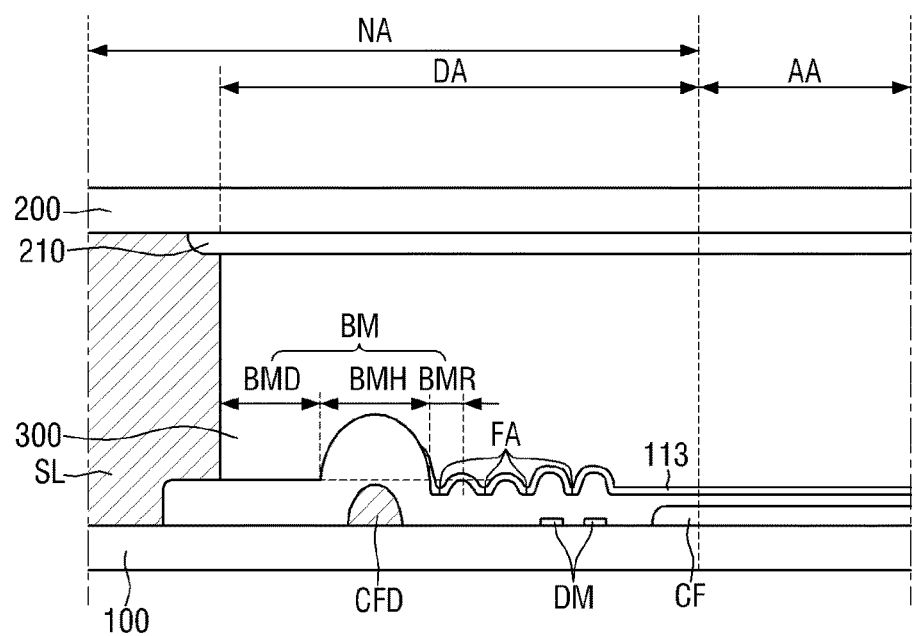
FIG. 11 is a cross-sectional view of the array substrate for a display device taken along line A-A' of FIG. 7 according to another exemplary embodiment of the invention.

FIG. 11 is a cross-sectional view of the array substrate for a display device taken along line A-A' of FIG. 7 according to another exemplary embodiment of the invention.

Referring to FIG. 11, the convex portions BMR of the black matrix BM may be spaced apart from each other. Furthermore, the convex portions BMR may be spaced apart from the dam portion BMH by a predetermined gap. Thus, a flat portion FA may be provided between the convex portions BMR and the dam portion BMH, and even between the convex portions BMR. Since other components have already been described above, a duplicated description thereof will be omitted.

Figure 12:
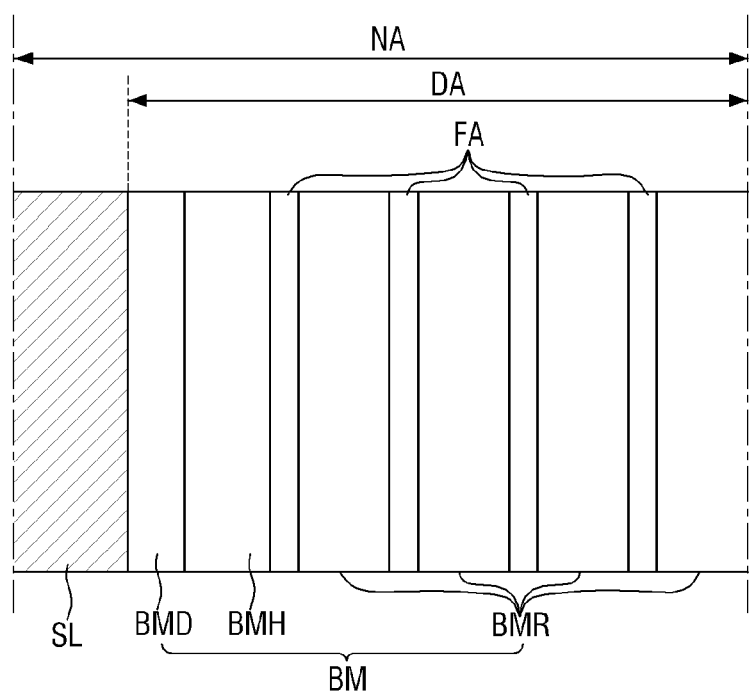
FIG. 12 is a plan view of part B of the array substrate for a display device of FIG. 7 according to yet another exemplary embodiment of the invention.

FIG. 12 is a plan view of part B of the array substrate for a display device of FIG. 7 according to the exemplary embodiment described with reference to FIG. 11. Referring to FIG. 12, the flat portion FA provided between the convex portions BMR and the dam portion BMH, and between the convex portions BMR may extend in one direction parallel to the direction in which the dam portion BMH extends. However, the invention is not limited thereto, and the arrangement may be modified appropriately by a person skilled in the art such that the flat portion FA may be interposed only between the convex portions BMR, and the convex portions BMR and the dam portion BMH may contact each other. Since other components have already been described above, a duplicated description thereof will be omitted.

Figure 13:
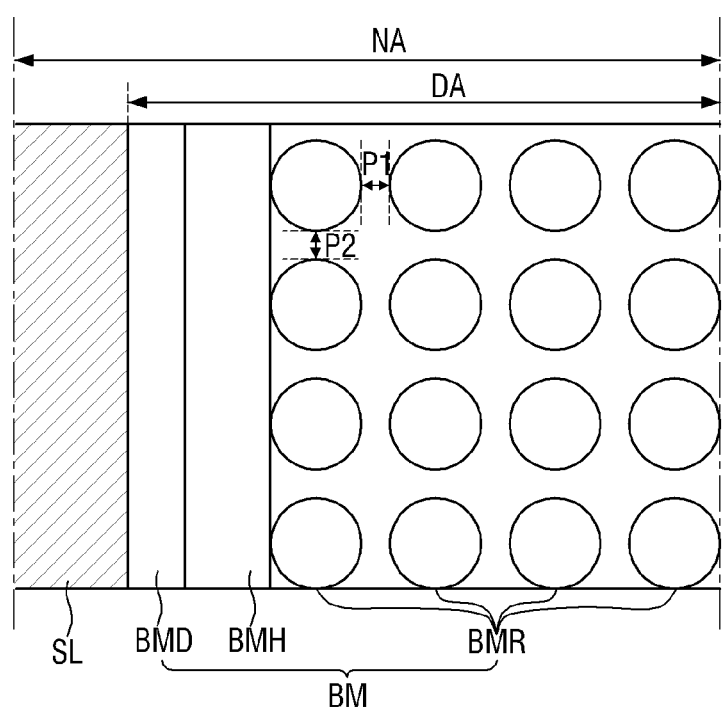
FIG. 13 is a plan view of part B of the array substrate for a display device of FIG. 7 according to still another exemplary embodiment of the invention.

FIG. 13 is a plan view of part B of the array substrate for a display device of FIG. 7 according to still another exemplary embodiment of the invention. Referring to FIG. 13, the convex portions BMR may have a circular horizontal cross sectional shape, and may be spaced apart from each other. Thus, the flat portion FA may be provided in the spaces among the convex portions BMR. That is, the convex portions BMR may be spaced apart from each other both in horizontal and vertical directions P1 and P2 on a horizontal cross sectional surface, and the flat portion FA may be provided among the convex portions BMR. As mentioned above, the horizontal cross sectional shape of the convex portions BMR is not limited to the circular shape as shown in FIG. 13, and the convex portions BMR may have a polygonal cross sectional shape including a tetragonal shape, a pentagonal shape and the like, or a mixed shape thereof. Since other components have already been described above, a duplicated description thereof will be omitted.

The invention now will be described with specific experimental data. In table 1 below, the term BCF denotes a blue color filter, and the term BM denotes a black matrix.

Embodiment 1 (E1)

An array substrate for a display device is fabricated in which a black matrix without a color filter in a dummy region on the substrate has a thickness of about 3.2 μm.

Embodiment 2 (E2)

An array substrate for a display device same as those of embodiment 1 is fabricated except that a black matrix has a thickness of about 2.8 μm.

Comparative Example 1 (CE1)

An array substrate for a display device same as those of embodiment 1 is fabricated except that a black matrix has a thickness of about 2.4 μm.

Comparative Example 2 (CE2)

An array substrate for a display device is fabricated in which a blue color filter has a thickness of about 3.2 μm, and a black matrix has a thickness of about 2 μm on the blue color filter on the substrate.

Comparative Example 3 (CE3)

An array substrate for a display device is fabricated in which a blue color filter has a thickness of about 3.2 μm, and a black matrix has a thickness of about 1.6 μm on the blue color filter on the substrate.

Experimental Example

A chrominance simulation is performed on the array substrates for a display device fabricated in embodiments 1 and 2 and comparative examples 1 and 2, and the result of the simulation is shown in the following table.

TABLE 1

| | Thickness (μm) | | x | y | Y | X | Z | L | a | b | ΔE*ab |
|---|---|---|---|---|---|---|---|---|---|---|---|
| | BCF | BM | | | | | | | | | |
| E1 | x | 3.2 | 0.265 | 0.310 | 0.310 | 0.266 | 0.426 | 0.914 | −3.183 | −1.505 | 14.040 |
| E2 | x | 2.8 | 0.260 | 0.310 | 0.990 | 0.830 | 1.373 | 8.908 | −5.467 | −2.361 | 20.650 |
| CE1 | x | 2.4 | 0.258 | 0.309 | 4.360 | 3.631 | 6.110 | 24.828 | −9.316 | −4.131 | 35.787 |
| CE2 | 3.2 | 2.0 | 0.142 | 0.080 | 0.840 | 1.479 | 8.128 | 7.580 | 21.917 | −41.306 | 39.709 |
| CE3 | 3.2 | 1.6 | 0.142 | 0.080 | 1.910 | 3.407 | 18.678 | 15.008 | 29.516 | −54.695 | 56.788 |

In Table 1, the occurrence of light leakage may be determined by ΔE*ab value. As ΔE*ab value becomes smaller, light leakage may be further improved.

In embodiments 1 and 2, since only the black matrix may be provided without a color filter in the non-display region, the substrate may have a thinner thickness than those of the substrates of comparative examples 2 and 3 in which both the blue color filter and the black matrix are provided.

However, light leakage is effectively improved in embodiments 1 and 2 despite the thinner thickness.

Light leakage is also significantly effectively improved in embodiments 1 and 2 in which only the black matrix is provided as compared with comparative example 1 in which the black matrix is provided to have a thickness of about 2.4 µm.

What is claimed is:

1. An array substrate for a display device, comprising:
   a first substrate which includes a display region and a non-display region enclosing a periphery of the display region;
   a second substrate facing the first substrate which includes the display region and the non-display region enclosing the periphery of the display region;
   a color filter disposed on the first substrate;
   a liquid crystal layer disposed on the color filter; and
   a black matrix disposed on the first substrate and contiguously in both the non-display region and at least a part of the display region,
   wherein the black matrix has a thickness ranging from about 2.5 micrometers to about 6.0 micrometers.

2. The array substrate for a display device of claim 1, wherein the thickness of the black matrix ranges from about 2.8 micrometers to about 3.2 micrometers.

3. An array substrate for a display device, comprising:
   a first substrate which includes a display region and a non-display region enclosing a periphery of the display region;
   a second substrate facing the first substrate which includes the display region and the non-display region enclosing the periphery of the display region;
   a color filter disposed on the first substrate;
   a liquid crystal layer disposed on the color filter;
   a black matrix disposed on the first substrate and contiguously in both the non-display region and at least a part of the display region, and
   a sealing material which is provided along peripheries of the first substrate and the second substrate in the non-display region and bonds and seals the first substrate and the second substrate,
   wherein the black matrix has a thickness ranging from about 2.5 micrometers to about 6.0 micrometers,
   wherein a dummy region is disposed between the sealing material and the display region, and
   the black matrix includes at least one convex portion convex toward the second substrate in the dummy region.

4. The array substrate for a display device of claim 3, wherein the at least one convex portion has a horizontal cross sectional surface shaped as a circle or a polygon.

5. The array substrate for a display device of claim 3, wherein the black matrix includes at least two convex portions, and the at least two convex portions are spaced apart from each other.

6. The array substrate for a display device of claim 5, wherein the black matrix has a flat portion between the at least two convex portions.

7. The array substrate for a display device of claim 3, further comprising a color filter dam disposed between the black matrix and the first substrate in the dummy region and extended in a first direction,
   wherein the black matrix includes a dam portion disposed on the color filter dam, wherein the dam portion is farther from the first substrate when compared with other portions of the black matrix.

8. The array substrate for a display device of claim 7, wherein the sealing material and the dam portion of the black matrix are spaced apart by a predetermined gap.

9. The array substrate for a display device of claim 7, wherein the at least two convex portion is disposed between the dam portion and the display region.

10. The array substrate for a display device of claim 7, wherein the at least two convex portion extends in parallel with the first direction of the dam portion.

11. The array substrate for a display device of claim 7, wherein the color filter dam includes components same as components of the color filter.

12. The array substrate for a display device of claim 7, further comprising an orientation layer disposed on the black matrix,
   Wherein the orientation layer is disposed all over the display region and disposed between the dam portion and the display region.

13. An array substrate for a display device, comprising:
   a first substrate which includes a display region and a non-display region enclosing a periphery of the display region
   a second substrate facing the first substrate which includes the display region and the non-display region enclosing the periphery of the display region;
   a color filter disposed on the first substrate;
   a liquid crystal layer disposed on the color filter;
   a black matrix provided in the non-display region and at least a part of the display region and disposed on the first substrate; and
   a sealing material which is provided along peripheries of the first substrate and the second substrate in the non-display region and bonds and seals the first substrate and the second substrate,
   wherein the color filter is not disposed between the black matrix and the first substrate in the at least a part of the non-display region, and
   the black matrix is directly in contact with the sealing material.

14. The array substrate for a display device of claim 13, wherein the black matrix has a thickness ranging from about 2.5 micrometers to about 6.0 micrometers in the non-display region.

15. The array substrate for a display device of claim 13, wherein the black matrix has a thickness ranging from about 2.8 micrometers to about 3.2 micrometers.

16. The array substrate for a display device of claim 13, wherein a dummy region is disposed between the sealing material and the display region, and
   the black matrix includes at least one convex portion convex toward the second substrate in the dummy region.

17. The array substrate for a display device of claim 16, further comprising a color filter dam disposed between the black matrix and the first substrate in a part of the dummy region, and including components same as components of the color filter,
   wherein the black matrix includes a dam portion disposed on the color filter dam,
   wherein the dam portion is farther from the first substrate when compared with other portions of the black matrix.

18. The array substrate for a display device of claim 17, wherein the at least one convex portion is disposed between the dam portion and the display region.

19. The array substrate for a display device of claim 16, wherein the at least one convex portion has a horizontal cross sectional surface shaped as a circle or a polygon.

20. The array substrate for a display device of claim 16, wherein the black matrix includes at least two convex portions, and the at least two convex portions spaced apart from each other.

\* \* \* \* \*